(12) United States Patent
Lu et al.

(10) Patent No.: US 11,658,579 B2
(45) Date of Patent: *May 23, 2023

(54) RESONANT CONTROL DEVICE AND RESONANT CONTROL METHOD THEREOF

(71) Applicants: MEAN WELL (GUANGZHOU) ELECTRONICS CO., LTD., Guangzhou (CN); MEAN WELL ENTERPRISES CO., LTD., New Taipei (TW)

(72) Inventors: Hsin-Hung Lu, New Taipei (TW); Po Han Huang, New Taipei (TW)

(73) Assignees: Mean Well (Guangzhou) Electronics Co., Ltd., Guangzhou (CN); Mean Well Enterprises Co., Ltd., New Taipei (TW)

( * ) Notice: Subject to any disclaimer, the term of this patent is extended or adjusted under 35 U.S.C. 154(b) by 32 days.

This patent is subject to a terminal disclaimer.

(21) Appl. No.: 17/335,721

(22) Filed: Jun. 1, 2021

(65) Prior Publication Data

US 2022/0294354 A1 Sep. 15, 2022

(30) Foreign Application Priority Data

Mar. 10, 2021 (CN) .......................... 202110261602.2

(51) Int. Cl.
*H02M 3/335* (2006.01)

(52) U.S. Cl.
CPC ................................ *H02M 3/33523* (2013.01)

(58) Field of Classification Search
None
See application file for complete search history.

(56) References Cited

U.S. PATENT DOCUMENTS 9,812,856 B2 * 11/2017 Lee .......................... H02M 1/32
9,960,689 B1 * 5/2018 Lu ............................ H02M 3/01

* cited by examiner

*Primary Examiner* — Jeffrey A Gblende
(74) *Attorney, Agent, or Firm* — Rosenberg, Klein & Lee (57) ABSTRACT

A resonant control device and a resonant control method thereof is provided. The resonant control device includes a feedback controller and a processor. The feedback controller receives a reference voltage and an output voltage and use the reference voltage to perform voltage compensation on the output voltage to generate a control parameter. The processor generates pulse modulation signals according to the control parameter and a switching parameter and uses the pulse modulation signals to drive the resonant converter to regulate the output voltage. The pulse modulation signal has the maximum frequency and the minimum frequency. The pulse modulation signals control the frequency according to the control parameter and the switching parameter when the control parameter is larger than or equal to the switching parameter. Otherwise, the pulse modulation signals control the resonant converter to operate for a fixed period within each cycle of the pulse modulation signal.

16 Claims, 8 Drawing Sheets

RESONANT CONTROL DEVICE AND RESONANT CONTROL METHOD THEREOF

This application claims priority of Application No. 202110261602.2 filed in Mainland China on 10 Mar. 2021 under 35 U.S.C. § 119; the entire contents of all of which are hereby incorporated by reference.

BACKGROUND OF THE INVENTION

Field of the Invention

The present invention relates to the resonant control technology, particularly to a resonant control device and a resonant control method thereof.

Description of the Related Art

In recent years, various electronic products develop toward preciseness and minimization. Presently, a conventional power converter cannot satisfy requirement for volume and efficiency. The power converter is asked to improve its power density. When the power semiconductor technology matured in 1970, a switching power supply was widely applied. Thus, nowadays, a switch mode power supply (SMPS) with high efficiency is important in power industry.

Figure 1:
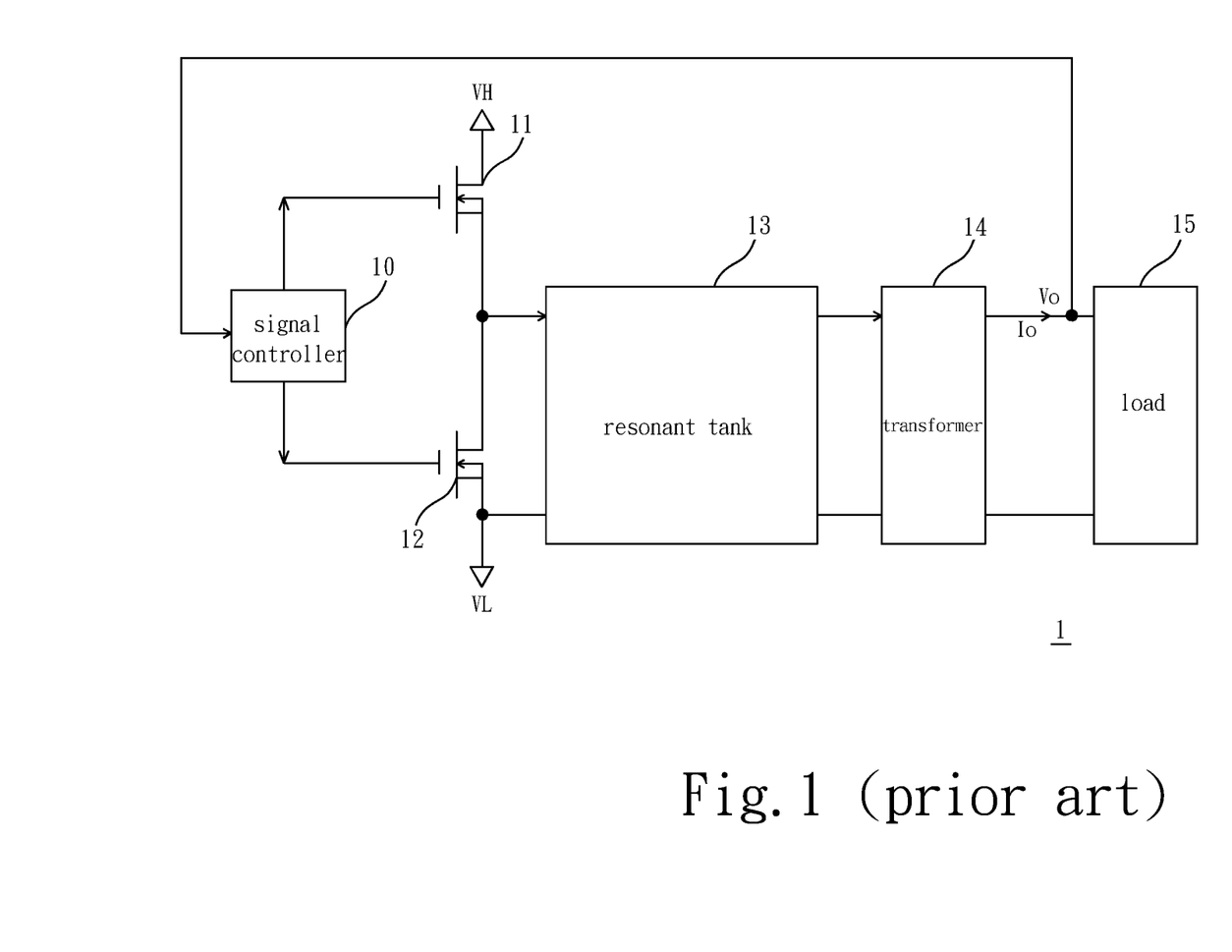
FIG. 1 is a diagram schematically showing a resonant converter in a conventional technology.
Figure 2:
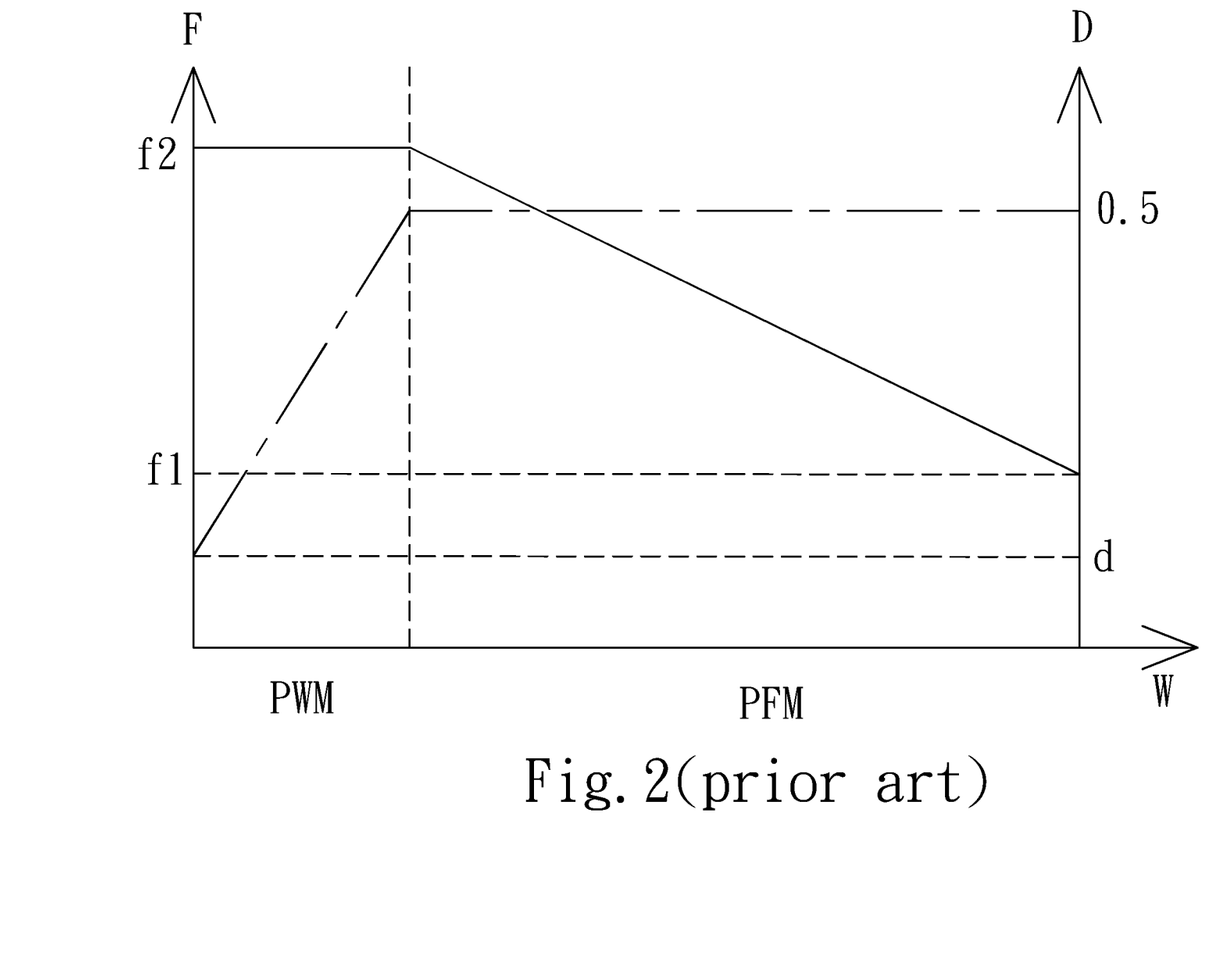
FIG. 2 is diagram showing curves of the duty cycle and the frequency of a pulse modulation signal versus an output power in a conventional technology.

The switching power supply uses a half-bridge resonant converter or a full-bridge resonant converter with high efficiency. The operation of the half-bridge resonant converter is similar to that of the full-bridge resonant converter. Take a half-bridge resonant converter as an example, as shown in FIG. 1. Referring to FIG. 1 and FIG. 2, the half-bridge resonant converter includes a signal controller 10, a first electrical switch 11, a second electrical switch 12, a resonant tank 13 and a transformer 14, wherein the first electrical switch 11 and the second electrical switch 12 are realized with NMOSFETs. Theoretically, the signal controller 10 generates two pulse modulation signals to alternately switch the first electrical switch 11 and the second electrical switch 12. When the first electrical switch 11 is turned on, the second electrical switch 12 is turned off whereby energy flows from a high voltage terminal VH to the resonant tank 13. When the first electrical switch 11 is turned off, the second electrical switch 12 is turned on whereby the energy is discharged from the resonant tank 13 to a low voltage terminal VL. The transformer 14 receives the energy of the resonant tank 13 to convert it into an output voltage Vo. The output voltage Vo is applied to the load 15 to generate an output current Io. The output voltage Vo and the output current Io form an output power W. The resonant converter 10 operates in PWM mode or PFM mode. In PWM mode, the pulse modulation signals are PWM signals. In PFM mode, the pulse modulation signals are PFM signals. In PWM mode, the duty cycle D of the PWM signal increases from a threshold value d until the duty cycle D reaches 0.5. In PFM mode, the duty cycle D of the PFM signal is 0.5. In PFM mode, the frequency F of the PFM signal increases as the output power W decreases. The frequency F of the PFM signal increases from the minimum frequency f1 until the frequency F reaches the maximum frequency f2. In PWM mode, the frequency F of the PWM signal is equal to the maximum frequency f2. If the half-bridge resonant converter operates in the lower-limit range of the output voltage Vo, the frequency F of the PWM signal has to increase to maintain the output voltage Vo. The PWM and PFM modes can improve the light-load efficiency and decrease the resonant current when the resonant converter starts. However, owning to the hardware limitation of the signal controller 10, the frequency F of the PWM signal cannot endlessly increase. As a result, the PWM mode is performed to achieve the effect of increasing the frequency F. However, the lower-limit range of the output voltage Vo is still not low enough. The half-bridge resonant converter is not suitable for applications where the output voltage Vo operates in a wide range. Furthermore, the PWM mode is in a high frequency state. Thus, the switching loss and the noise are higher in PWM mode.

To overcome the abovementioned problems, the present invention provides a resonant control device and a resonant control method thereof.

SUMMARY OF THE INVENTION

The primary objective of the present invention is to provide a resonant control device and a resonant control method thereof, which improve the light-load efficiency of a resonant converter, lower the low limit of the output voltage of the resonant converter, enlarge the operating range of the output voltage of the resonant converter, and decrease the start-up resonant current, switching loss, and noise.

In an embodiment of the present invention, a resonant control device includes

In an embodiment of the present invention, a resonant control device includes a feedback controller and a processor. The feedback controller is coupled to the output terminal of a resonant converter. The output terminal is coupled to a load. An output voltage is applied across the load. The feedback controller is configured to receive a reference voltage and the output voltage and use the reference voltage to perform voltage compensation on the output voltage to generate a control parameter. The processor is coupled to the feedback controller and the resonant converter. The processor presets a switching parameter. The processor is configured to receive the control parameter, generate pulse modulation signals according to the control parameter and the switching parameter, and use the pulse modulation signals to drive the resonant converter to regulate the output voltage. The pulse modulation signal has the maximum frequency and the minimum frequency. The maximum frequency corresponds to the switching parameter. The pulse modulation signals are pulse frequency modulation signals when the control parameter is larger than or equal to the switching parameter. The pulse modulation signals control the resonant converter to operate for a fixed period within each cycle of the pulse modulation signal when the control parameter is less than the switching parameter.

In an embodiment of the present invention, the duty cycle of the pulse frequency modulation signal is 0.5.

In an embodiment of the present invention, the output voltage is applied to the load to generate an output current. The output voltage and the output current form an output power. The frequency of the pulse frequency modulation signal is linearly inversely proportional to the output power.

In an embodiment of the present invention, the output voltage is applied to the load to generate an output current. The output voltage and the output current form an output power. The frequency of the pulse modulation signal is directly linearly proportional to the output power when the control parameter is less than the switching parameter.

In an embodiment of the present invention, the duty cycle of the pulse modulation signal is directly linearly proportional to the output power when the control parameter is less than the switching parameter. The maximum value of the duty cycle is 0.5. The minimum value of the duty cycle equals the fixed period multiplied by the minimum frequency, and the minimum value is less than 0.5.

In an embodiment of the present invention, the switching parameter is equal to the maximum frequency. The feedback controller includes a subtractor, a voltage compensator, and a digital voltage-controlled oscillator. The subtractor is coupled to the output terminal and configured to receive the reference voltage and the output voltage and subtract the output voltage from the reference voltage to obtain a difference voltage. The voltage compensator is coupled to the subtractor and configured to receive the difference voltage and perform voltage compensation on the difference voltage to generate a voltage parameter. The digital voltage-controlled oscillator is coupled to the voltage compensator and the processor and configured to receive the voltage parameter. The digital voltage-controlled oscillator is configured to generate a control frequency as the control parameter based on the voltage parameter, the maximum frequency, and the minimum frequency.

In an embodiment of the present invention, the control frequency is represented by Fc, $Fc=(F_{min}-F_{max})\times P+F_{max}$, $F_{min}$ represents the minimum frequency, $F_{max}$ represents the maximum frequency, and P represents the voltage parameter.

In an embodiment of the present invention, the voltage compensator is a proportional-integral-derivative controller (PID controller) or a proportional-integral controller (PI controller).

In an embodiment of the present invention, the resonant converter is a full-bridge resonate converter or a half-bridge resonate converter.

In an embodiment of the present invention, the minimum frequency and the maximum frequency are determined by a resonant tank of the resonant converter, the resonant tank includes a resonating inductor $L_R$, a magnetizing inductor $L_M$, and a resonating capacitor $C_R$ connected in series, the minimum frequency ranges between $$\frac{1}{2\pi\sqrt{(L_R+L_M)C_R}} \text{ and } \frac{1}{2\pi\sqrt{L_R\cdot C_R}},$$

and the maximum frequency is larger than $$\frac{1}{2\pi\sqrt{L_R C_R}}.$$

In an embodiment of the present invention, a resonant control method controls a resonant converter coupled to a load. An output voltage is applied across the load. The resonant control method includes: receiving a reference voltage and the output voltage and using the reference voltage to perform voltage compensation on the output voltage to generate a control parameter; receiving the control parameter and determining whether the control parameter is less than a switching parameter: when the control parameter is less than the switching parameter, generating pulse modulation signals according to the control parameter and the switching parameter and using the pulse modulation signals to control the resonant converter to operate for a fixed period within each cycle of the pulse modulation signal, thereby regulating the output voltage; and when the control parameter is not less than the switching parameter, generating pulse frequency modulation signals according to the control parameter and the switching parameter and using the pulse frequency modulation signals to drive the resonant converter to regulate the output voltage; wherein each of the pulse modulation signal and the pulse frequency modulation signal has a maximum frequency and a minimum frequency, and the maximum frequency corresponds to the switching parameter.

In an embodiment of the present invention, the duty cycle of the pulse frequency modulation signal is 0.5.

In an embodiment of the present invention, the output voltage is applied to the load to generate an output current. The output voltage and the output current form an output power. The frequency of the pulse frequency modulation signal is linearly inversely proportional to the output power.

In an embodiment of the present invention, the output voltage is applied to the load to generate an output current. The output voltage and the output current form an output power. The frequency of the pulse modulation signal is directly linearly proportional to the output power when the control parameter is less than the switching parameter.

In an embodiment of the present invention, the duty cycle of the pulse modulation signal is directly linearly proportional to the output power when the control parameter is less than the switching parameter. The maximum value of the duty cycle is 0.5. The minimum value of the duty cycle equals the fixed period multiplied by the minimum frequency. The minimum value is less than 0.5.

In an embodiment of the present invention, the switching parameter is equal to the maximum frequency. The step of receiving the reference voltage and the output voltage and using the reference voltage to perform voltage compensation on the output voltage to generate the control parameter includes: receiving the reference voltage and the output voltage and subtracting the output voltage from the reference voltage to obtain the difference voltage; receiving the difference voltage and performing voltage compensation on the difference voltage to generate a voltage parameter; and receiving the voltage parameter and generating a control frequency as the control parameter based on the voltage parameter, the maximum frequency, and the minimum frequency.

In an embodiment of the present invention, the control frequency is represented by Fc, $Fc=(F_{min}-F_{max})\times P+F_{max}$, $F_{min}$ represents the minimum frequency, $F_{max}$ represents the maximum frequency, and P represents the voltage parameter.

In an embodiment of the present invention, the minimum frequency and the maximum frequency are determined by a resonant tank of the resonant converter, the resonant tank includes a resonating inductor $L_R$, a magnetizing inductor $L_M$, and a resonating capacitor $C_R$ connected in series, the minimum frequency ranges between $$\frac{1}{2\pi\sqrt{(L_R+L_M)C_R}} \text{ and } \frac{1}{2\pi\sqrt{L_R\cdot C_R}},$$

and the maximum frequency is larger than $$\frac{1}{2\pi\sqrt{L_R C_R}}.$$

To sum up, the resonant control device and the resonant control method thereof set a switching parameter without increasing a hardware cost and perform a constant on-time modulation mode or a pulse frequency modulation mode to improve the light-load efficiency of a resonant converter, lower the low limit of the output voltage of the resonant converter, enlarge the operating range of the output voltage of the resonant converter, and decrease the start-up resonant current, switching loss, and noise. In addition, the digital voltage-controlled oscillator generates a control frequency which is linearly inversely proportional to the voltage parameter to improve the stability of the variation of the control parameter.

Below, the embodiments are described in detail in cooperation with the drawings to make easily understood the technical contents, characteristics and accomplishments of the present invention.

DETAILED DESCRIPTION OF THE INVENTION

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

When an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the article "a" and "the" includes the meaning of "one or at least one" of the element or component. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. Every example in the present specification cannot limit the claimed scope of the invention.

Besides, the term "electrically coupled" can be referring to either directly connecting or indirectly connecting between elements. Thus, if it is described in the below contents of the present invention that a first device is electrically coupled to a second device, the first device can be directly connected to the second device, or indirectly connected to the second device through other devices or means. Moreover, when the transmissions or generations of electrical signals are mentioned, one skilled in the art should understand some degradations or undesirable transformations could be generated during the operations. If it is not specified in the specification, an electrical signal at the transmitting end should be viewed as substantially the same signal as that at the receiving end. For example, when the end A of an electrical circuit provides an electrical signal S to the end B of the electrical circuit, the voltage of the electrical signal S may drop due to passing through the source and drain of a transistor or due to some parasitic capacitance. However, the transistor is not deliberately used to generate the effect of degrading the signal to achieve some result, that is, the signal S at the end A should be viewed as substantially the same as that at the end B.

Furthermore, it can be understood that the terms "comprising," "including," "having," "containing," and "involving" are open-ended terms, which refer to "may include but is not limited to so." Besides, each of the embodiments or claims of the present invention is not necessary to achieve all the effects and advantages possibly to be generated, and the abstract and title of the present invention is used to assist for patent search and is not used to further limit the claimed scope of the present invention.

Figure 3:
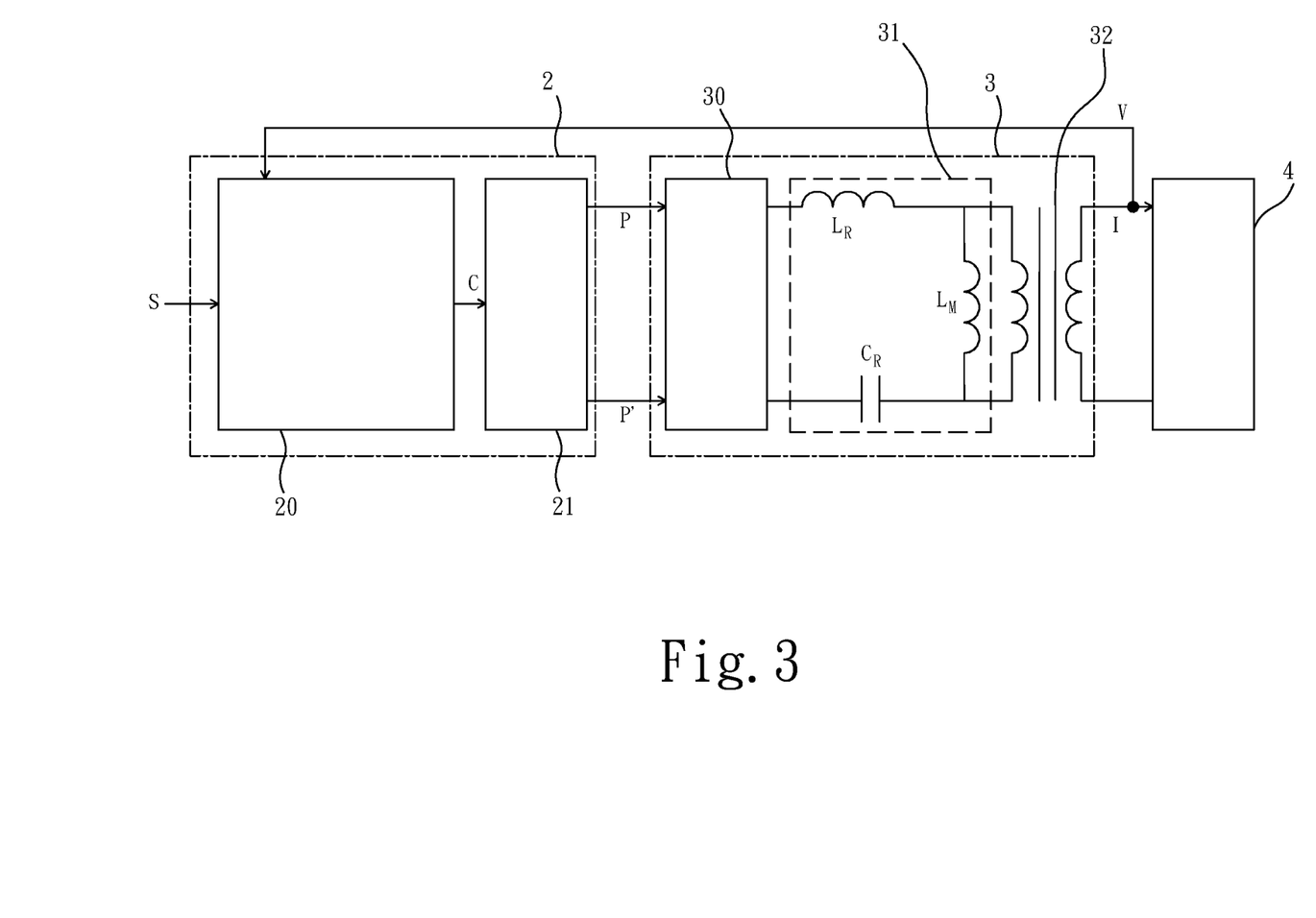
FIG. 3 is a diagram schematically showing a resonant control device and a resonant converter according to a first embodiment of the present invention.
Figure 4:
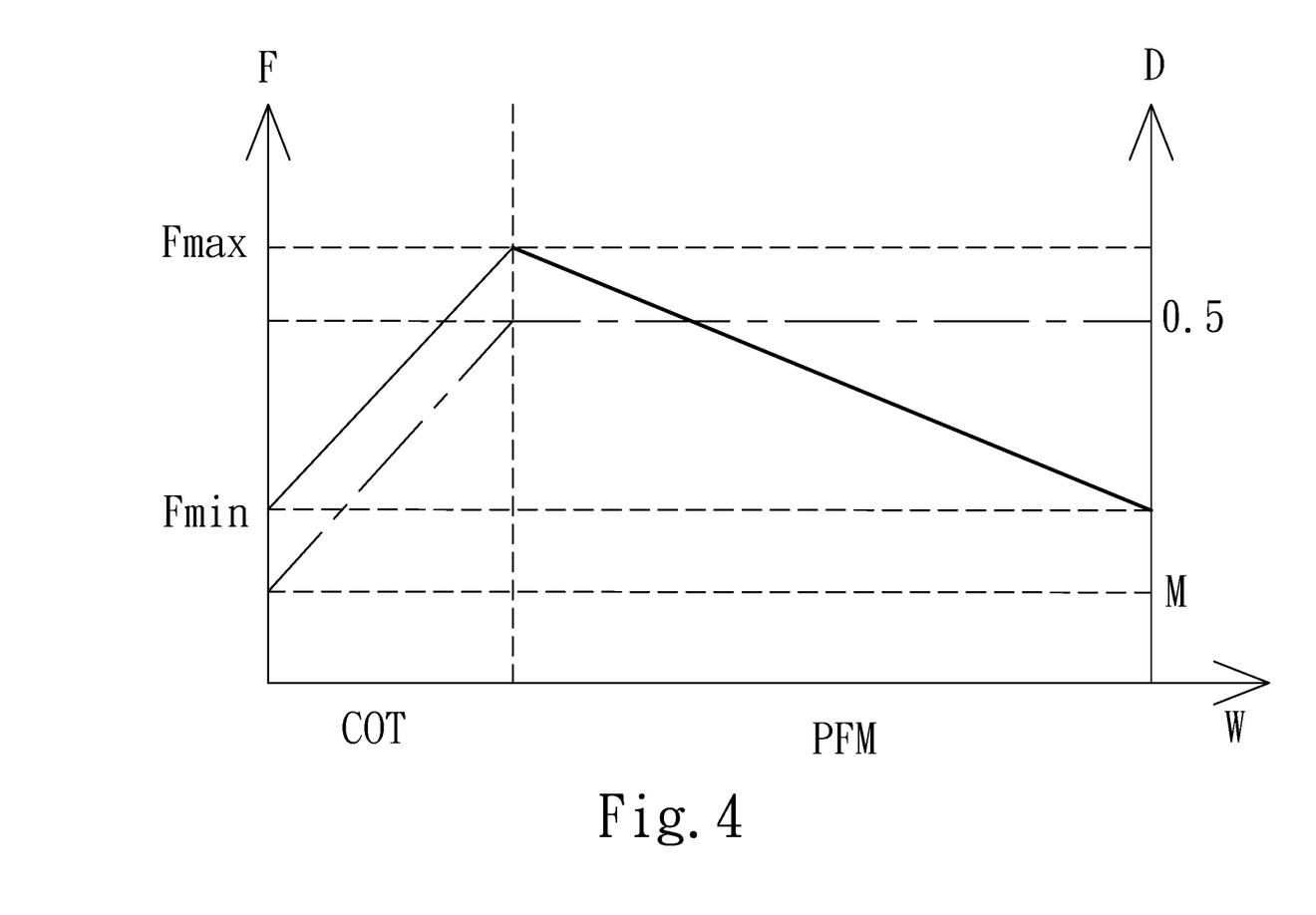
FIG. 4 is diagram showing curves of the duty cycle and the frequency of a pulse modulation signal versus an output power according to an embodiment of the present invention.
Figure 5:
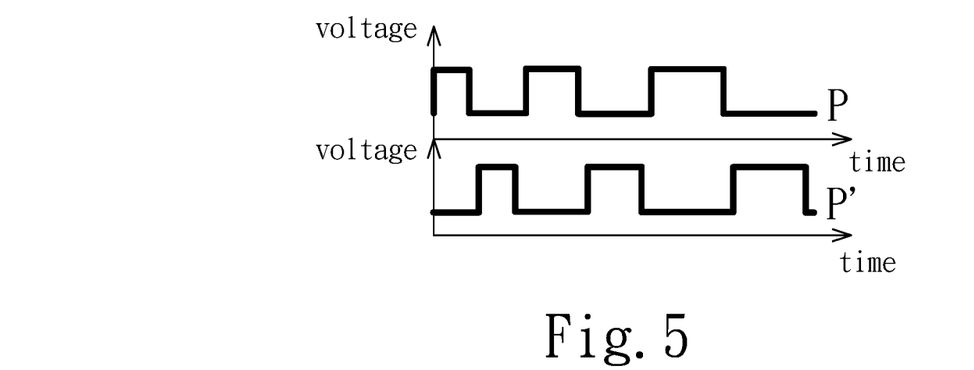
FIG. 5 is a diagram showing the waveforms of pulse modulation signals in pulse frequency modulation (PFM) mode according to an embodiment of the present invention.
Figure 6:
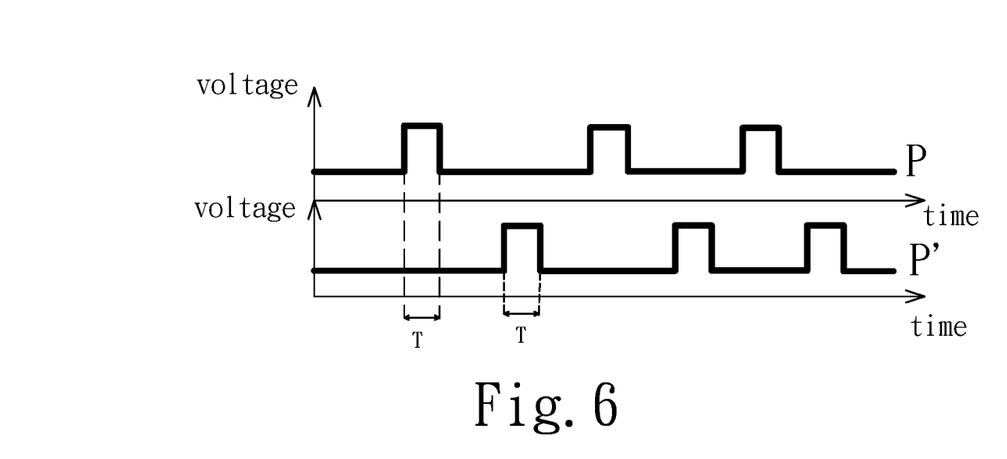
FIG. 6 is a diagram showing the waveforms of pulse modulation signals in pulse width modulation (PWM) mode according to an embodiment of the present invention.

FIG. 3 is a diagram schematically showing a resonant control device and a resonant converter according to a first embodiment of the present invention. FIG. 4 is diagram showing curves of the duty cycle and the frequency of a pulse modulation signal versus an output power according to an embodiment of the present invention. FIG. 5 is a diagram showing the waveforms of pulse modulation signals in pulse frequency modulation (PFM) mode according to an embodiment of the present invention. FIG. 6 is a diagram showing the waveforms of pulse modulation signals in pulse width modulation (PWM) mode according to an embodiment of the present invention. Referring to FIG. 3 and FIG. 4, the resonant control device 2 of the first embodiment of the present invention is introduced as follows. The resonant control device 2 includes a feedback controller 20 and a processor 21. The feedback controller 20 is coupled to the output terminal of a resonant converter 3. The output terminal is coupled to a load 4. An output voltage V is applied across the load 4. The output voltage V is applied to the load 4 to generate an output current I. The output voltage V and the output current I form an output power W. The resonant converter 3 may be a full-bridge resonate converter or a half-bridge resonate converter. The feedback controller 20 is configured to receive a reference voltage S and the output voltage V and use the reference voltage S to perform voltage compensation on the output voltage V to generate a control parameter C. The processor 21, coupled to the feedback controller 20 and the resonant converter 3, presets a switching parameter. The processor 21 is configured to receive the control parameter C, generate pulse modulation signals P and P' according to the control parameter C and the switching parameter, and use the pulse modulation signals P and P' to drive the resonant converter 3 to regulate the output voltage V. Each of the pulse modulation signals P and P' has the maximum frequency $F_{max}$ and the minimum frequency $F_{min}$. The maximum frequency $F_{max}$ corresponds to the switching parameter. The pulse modulation signals P and P' are pulse frequency modulation signals such that the resonant converter 3 operates in pulse frequency modulation (PFM) mode when the control parameter C is larger than or equal to the switching parameter. The pulse modulation signals P and P' control the resonant converter 3 to operate for a fixed period within each cycle of the pulse modulation signal P or P' such that the resonant converter 3 operates in constant on-time (COT) mode when the control parameter C is less than the switching parameter.

In some embodiments of the present invention, the resonant converter may include an electrical switch set 30, a resonant tank 31, and a transformer 2. The electrical switch set 30 is coupled to the processor 21 and the resonant tank 31. The resonant tank 31 is coupled to the primary side of the transformer 32. The secondary side of the transformer 32 is used as the output terminal of the resonant converter 3. The electrical switch set 30 is configured to receive the pulse modulation signals P and P' and use the pulse modulation signals P and P' to drive the transformer 32 through the resonant tank 31, thereby varying the output voltage V. For example, the minimum frequency $F_{min}$ and the maximum frequency $F_{max}$ are determined by the resonant tank 31 of the resonant converter 3. The resonant tank 31 includes a resonating inductor $L_R$, a magnetizing inductor $L_M$, and a resonating capacitor $C_R$ connected in series. The minimum frequency $F_{min}$ ranges between $$\frac{1}{2\pi\sqrt{(L_R+L_M)C_R}} \text{ and } \frac{1}{2\pi\sqrt{L_R \cdot C_R}}.$$

The maximum frequency $F_{max}$ is larger than $$\frac{1}{2\pi\sqrt{L_R C_R}}.$$

As shown in FIG. 3, FIG. 4, FIG. 5, and FIG. 6, the duty cycle of the pulse frequency modulation signal may be 0.5. The frequency F of the pulse frequency modulation signal is linearly inversely proportional to the output power W. The maximum value of the frequency F is the maximum frequency $F_{max}$. The minimum value of the frequency F is the minimum frequency $F_{min}$. The two pulse frequency modulation signals do not simultaneously have high-level voltages lest the circuit be burnt out. If the frequency F of the pulse frequency modulation signal is less than the minimum frequency $F_{min}$, the pulse frequency modulation signal has the minimum value M of the duty cycle D. When the control parameter C is less than the switching parameter, the frequency F of each of the pulse modulation signals P and P' is directly linearly proportional to the output power W. Besides, the maximum value and the minimum value of the frequency F of the pulse modulation signal P or P' are respectively the maximum frequency $F_{max}$ and the minimum frequency $F_{min}$. When the control parameter C is less than the switching parameter, the duty cycle D of the pulse modulation signal P or P' is directly linearly proportional to the output power W. The duty cycle D has the maximum value of 0.5. The minimum value of the duty cycle D equals the fixed period T when the resonant converter 3 operates multiplied by the minimum frequency $F_{min}$. The minimum value M of the duty cycle D is less than 0.5. In general, the fixed period T is the shortest period when the resonant converter 3. The fixed period T is determined by the hardware of the resonant converter 3. In COT mode, the period when the resonant converter 3 operates is fixed and the frequency F is varied. Thus, the variable duty cycle D is obtained. As shown in FIG. 6, the phase of the pulse modulation signal P lags behind the phase of the pulse modulation signal P' by 180 degrees. The two pulse modulation signals P and P' do not simultaneously have high-level voltages lest the circuit be burnt out. The resonant control device sets the switching parameter without increasing a hardware cost and performs a constant on-time modulation mode or a pulse frequency modulation mode to improve the light-load efficiency of the resonant converter 3 and decrease the start-up resonant current, switching loss, and noise. In addition, the COT mode can extend the range of the output voltage or the output current not covered by the PWM mode. As a result, the resonant control device 2 can lower the low limit of the output voltage of the resonant converter 3, enlarge the operating range of the output voltage, and decrease the times of performing burst modes.

Figure 7:
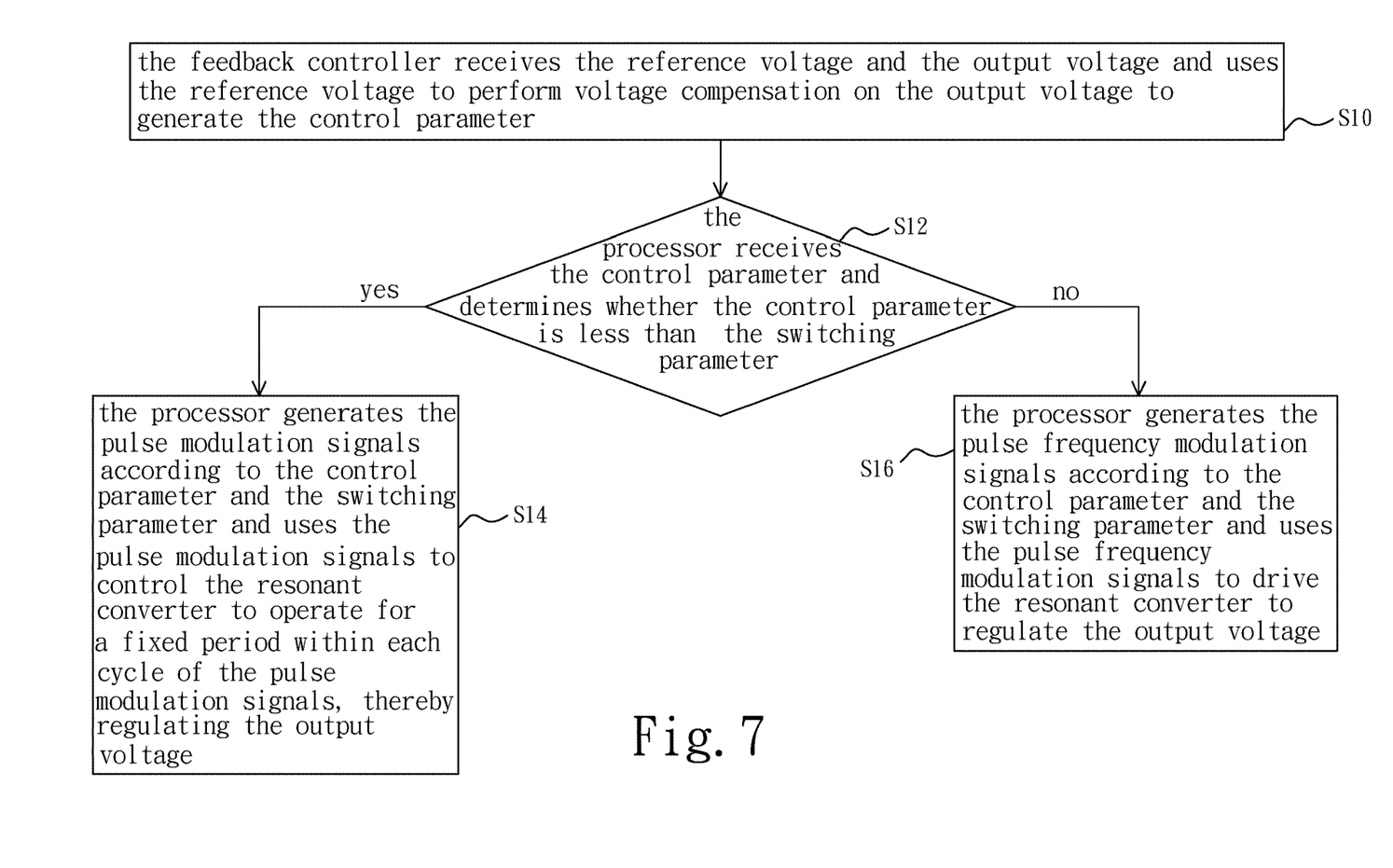
FIG. 7 is a flowchart of a resonant control method according to an embodiment of the present invention.

FIG. 7 is a flowchart of a resonant control method according to an embodiment of the present invention. Referring to FIG. 3 and FIG. 7, the resonant control method of the resonant control device 2 of an embodiment of the present invention is introduced as follows. In Step S10, the feedback controller 20 receives the reference voltage S and the output voltage V and uses the reference voltage S to perform voltage compensation on the output voltage V to generate the control parameter C. In Step S12, the processor 21 receives the control parameter C and determines whether the control parameter C is less than the switching parameter. When the control parameter C is less than the switching parameter, the procedure performs Step S14. In Step S14, the processor 21 generates the pulse modulation signals P and P' according to the control parameter C and the switching parameter and uses the pulse modulation signals P and P' to control the resonant converter 3 to operate for a fixed period within each cycle of the pulse modulation signals P or P', thereby regulating the output voltage V. When the control parameter C is not less than the switching parameter, the procedure performs Step S16. In Step S16, the processor 21 generates the pulse frequency modulation signals according to the control parameter C and the switching parameter and uses the pulse frequency modulation signals to drive the resonant converter 3 to regulate the output voltage V.

As shown in FIG. 3 and FIG. 4, when the load 4 becomes light, the value of the control parameter C decreases. When the control parameter C is less than the switching parameter, the processor 21 generates the pulse modulation signals P and P' and uses the pulse modulation signals P and P' to control the resonant converter 3 to operate for a fixed period within each cycle of the pulse modulation signal P or P', thereby regulating the output voltage V. The duty cycle D and the frequency F of each of the pulse modulation signals P and P' depend on the output power W. When the load 4 becomes heavy, the value of the control parameter C increases. When the control parameter C is larger than or equal to the switching parameter, the processor 21 generates the pulse frequency modulation signals according to the control parameter C and the switching parameter and uses the pulse frequency modulation signals to drive the resonant converter 3 to regulate the output voltage V. The frequency F of the pulse frequency modulation signal depends on the output power W. The duty cycle D of the pulse frequency modulation signal is fixed to 0.5. Alternatively, the reference voltage S may be varied to generate the pulse modulation signals P and P' or the pulse frequency modulation signals. When the reference voltage S is decreased and the output voltage V is fixed, the value of the control parameter C decreases. When the control parameter C is less than the switching parameter, the processor 21 generates the pulse modulation signals P and P' and uses the pulse modulation signals P and P' to control the resonant converter 3 to operate for a fixed period within each cycle of the pulse modulation signal P or P', thereby regulating the output voltage V. The duty cycle D and the frequency F of each of the pulse modulation signals P and P' depend on the output power W. When the reference voltage S is increased and the output voltage V is fixed, the value of the control parameter C increases. When the control parameter C is larger than or equal to the switching parameter, the processor 21 generates the pulse frequency modulation signals according to the control parameter C and the switching parameter and uses the pulse frequency modulation signals to drive the resonant converter 3 to regulate the output voltage V. The frequency F of the pulse frequency modulation signal depends on the output power W. The duty cycle D of the pulse frequency modulation signal is fixed to 0.5.

Figure 8:
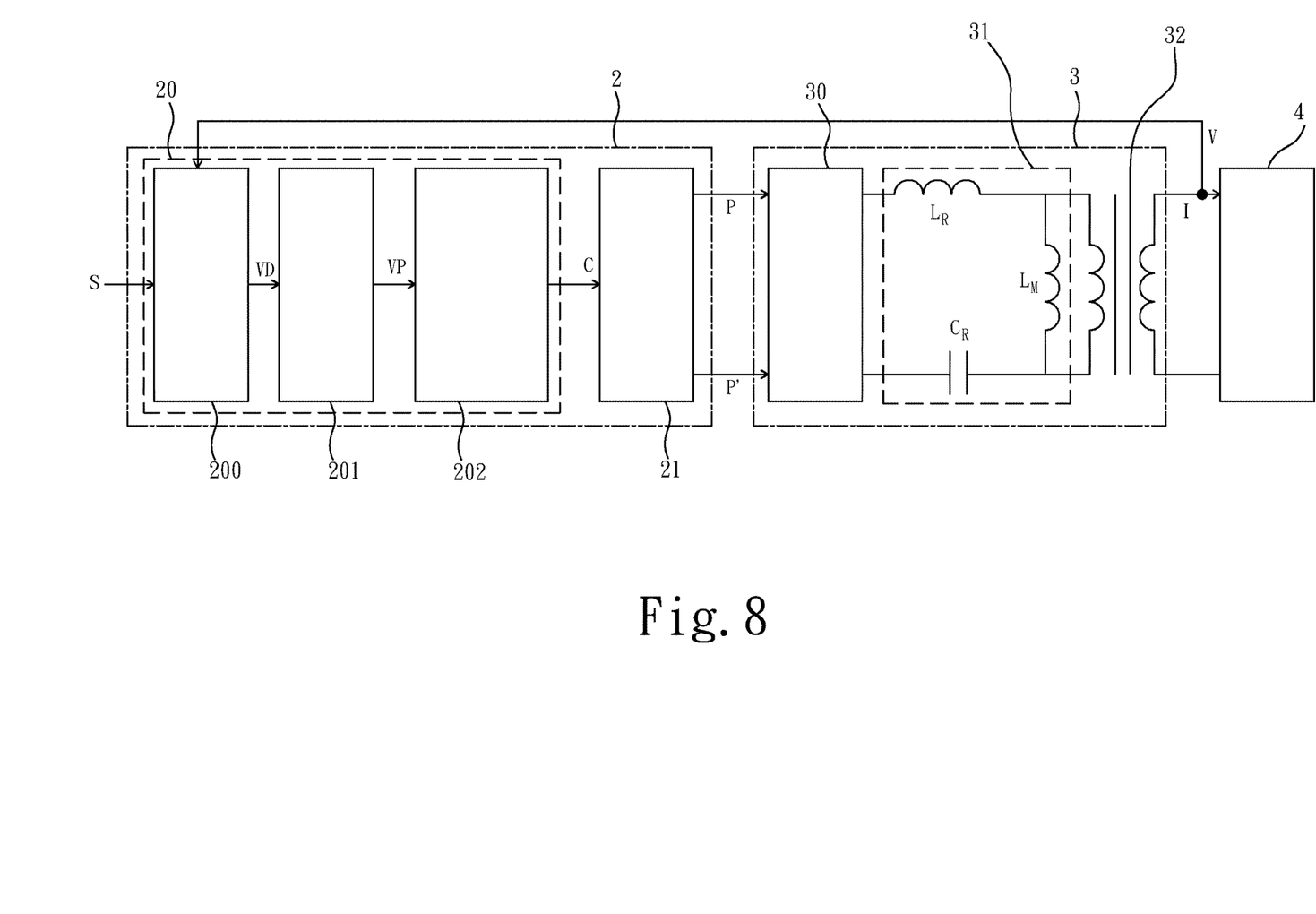
FIG. 8 is a diagram schematically showing a resonant control device and a resonant converter according to a second embodiment of the present invention.
Figure 9:
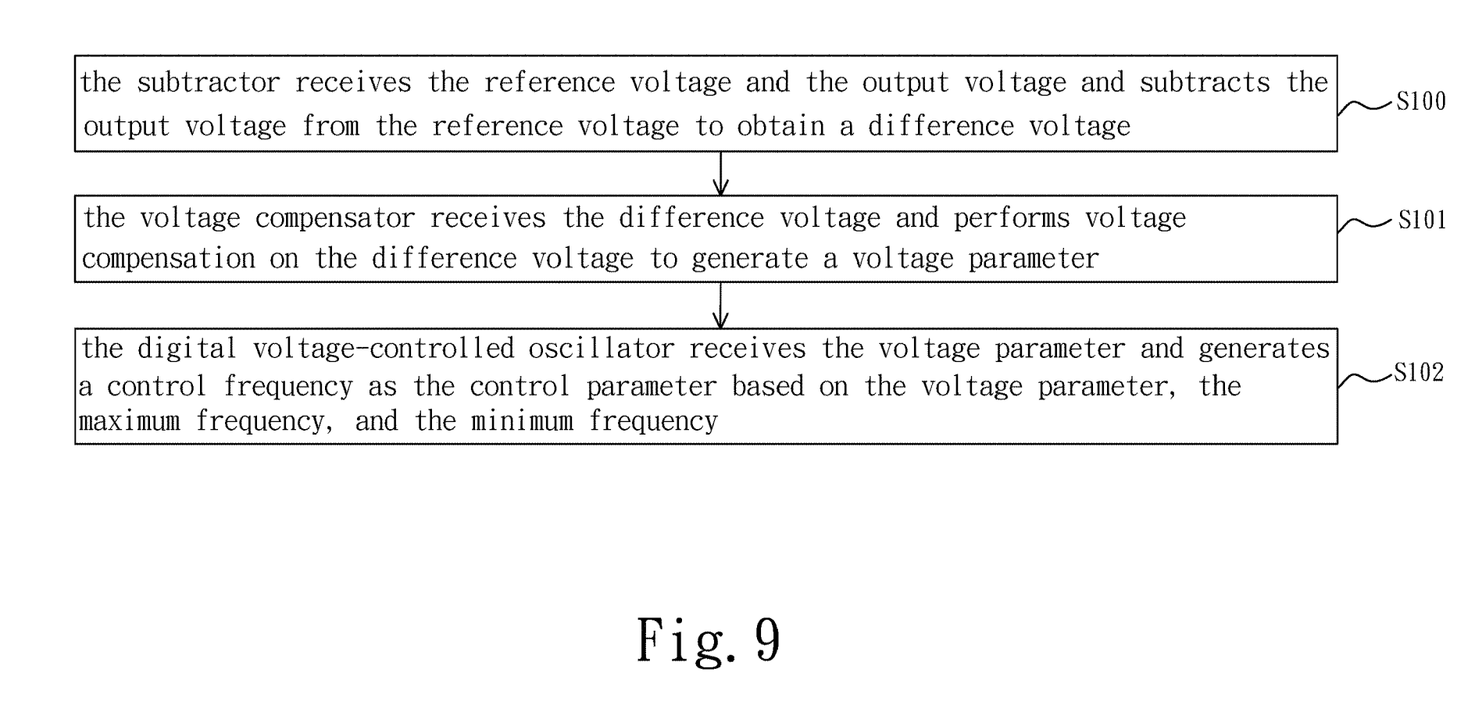
FIG. 9 is a flowchart of generating a control parameter according to an embodiment of the present invention.

FIG. 8 is a diagram schematically showing a resonant control device and a resonant converter according to a second embodiment of the present invention. FIG. 9 is a flowchart of generating a control parameter according to an embodiment of the present invention. Referring to FIG. 8 and FIG. 9, the resonant control device 2 of the second embodiment of the present invention is introduced as follows. The second embodiment is different from the first embodiment in the feedback controller 20, the switching parameter, and the control parameter C. The other technical features of the second embodiment are the same as those of the first embodiment so will not be reiterated. In the second embodiment, the switching parameter is equal to the maximum frequency $F_{max}$. The feedback controller 20 includes a subtractor 200, a voltage compensator 201, and a digital voltage-controlled oscillator 202. The voltage compensator 201 may be a proportional-integral-derivative controller (PID controller) or a proportional-integral controller (PI controller). The subtractor 200 is coupled to the output terminal of the resonant converter 3. The voltage compensator 201 is coupled to the subtractor 200. The digital voltage-controlled oscillator 202 is coupled to the voltage compensator 201 and the processor 21. The resonant control method of the resonant control device 2 of an embodiment of the present invention is introduced as follows. In Step S100, the subtractor 200 receives the reference voltage S and the output voltage V and subtracts the output voltage V from the reference voltage S to obtain a difference voltage VD. In Step S101, the voltage compensator 201 receives the difference voltage VD and performs voltage compensation on the difference voltage VD to generate a voltage parameter VP. The voltage parameter VP is a coefficient related to voltage without any unit. In Step S102, the digital voltage-controlled oscillator 202 receives the voltage parameter VP and generates a control frequency as the control parameter C based on the voltage parameter VP, the maximum frequency $F_{max}$, and the minimum frequency $F_{min}$. In some embodiments of the present invention, the control frequency is represented by Fc, $Fc=(F_{min}-F_{max}) \times P+F_{max}$, $F_{min}$ represents the minimum frequency, $F_{max}$ represents the maximum frequency, and P represents the voltage parameter. Since the control frequency is linearly inversely proportional to the voltage parameter, the stability of the variation of the control parameter C can be improved.

According to the embodiment provided above, the resonant control device and the resonant control method thereof set a switching parameter without increasing a hardware cost and perform a constant on-time modulation mode or a pulse frequency modulation mode to improve the light-load efficiency of a resonant converter, lower the low limit of the output voltage of the resonant converter, enlarge the operating range of the output voltage of the resonant converter, and decrease the start-up resonant current, switching loss, and noise. In addition, the digital voltage-controlled oscillator generates a control frequency which is linearly inversely proportional to the voltage parameter to improve the stability of the variation of the control parameter.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A resonant control device comprising:
    a feedback controller coupled to an output terminal of a resonant converter, the output terminal is coupled to a load, and an output voltage is applied across the load, wherein the feedback controller is configured to receive a reference voltage and the output voltage and use the reference voltage to perform voltage compensation on the output voltage to generate a control parameter; and
    a processor, coupled to the feedback controller and the resonant converter, presetting a switching parameter, wherein the processor is configured to receive the control parameter, generate pulse modulation signals according to the control parameter and the switching parameter, and use the pulse modulation signals to drive the resonant converter to regulate the output voltage, the pulse modulation signal has a maximum frequency and a minimum frequency, the maximum frequency corresponds to the switching parameter, the pulse modulation signals are pulse frequency modulation signals when the control parameter is larger than or equal to the switching parameter, and the pulse modulation signals control the resonant converter to operate for a fixed period within each cycle of the pulse modulation signal when the control parameter is less than the switching parameter;
wherein the output voltage is applied to the load to generate an output current, the output voltage and the output current form an output power, and a frequency of the pulse modulation signal is directly linearly proportional to the output power when the control parameter is less than the switching parameter.

2. The resonant control device according to claim 1, wherein a duty cycle of the pulse frequency modulation signal is 0.5.

3. The resonant control device according to claim 2, wherein a frequency of the pulse frequency modulation signal is linearly inversely proportional to the output power.

4. The resonant control device according to claim 1, wherein a duty cycle of the pulse modulation signal is directly linearly proportional to the output power when the control parameter is less than the switching parameter, a maximum value of the duty cycle is 0.5, a minimum value of the duty cycle equals the fixed period multiplied by the minimum frequency, and the minimum value is less than 0.5.

5. The resonant control device according to claim 1, wherein the switching parameter is equal to the maximum frequency and the feedback controller comprises:
a subtractor coupled to the output terminal and configured to receive the reference voltage and the output voltage and subtract the output voltage from the reference voltage to obtain a difference voltage;
a voltage compensator coupled to the subtractor and configured to receive the difference voltage and perform voltage compensation on the difference voltage to generate a voltage parameter; and
a digital voltage-controlled oscillator coupled to the voltage compensator and the processor and configured to receive the voltage parameter, wherein the digital voltage- controlled oscillator is configured to generate a control frequency as the control parameter based on the voltage parameter, the maximum frequency, and the minimum frequency.

6. The resonant control device according to claim 5, wherein the control frequency is represented by Fc, Fc= $(F_{min}-F_{max}) \times P + F_{max}$, $F_{min}$ represents the minimum frequency, F max represents the maximum frequency, and P represents the voltage parameter.

7. The resonant control device according to claim 5, wherein the voltage compensator is a proportional-integral-derivative controller (PID controller) or a proportional-integral controller (PI controller).

8. The resonant control device according to claim 1, wherein the resonant converter is a full-bridge resonate converter or a half-bridge resonate converter.

9. The resonant control device according to claim 1, wherein the minimum frequency and the maximum frequency are determined by a resonant tank of the resonant converter, the resonant tank comprises a resonating inductor $L_R$, a magnetizing inductor $L_M$, and a resonating capacitor $C_R$ connected in series, the minimum frequency ranges between $$\frac{1}{2\pi\sqrt{(L_R+L_M)C_R}} \text{ and } \frac{1}{2\pi\sqrt{L_R \cdot C_R}},$$

and the maximum frequency is larger than $$\frac{1}{2\pi\sqrt{L_R C_R}}.$$

10. A resonant control method, which controls a resonant converter coupled to a load, an output voltage is applied across the load, and the resonant control method comprising:
receiving a reference voltage and the output voltage and using the reference voltage to perform voltage compensation on the output voltage to generate a control parameter;
receiving the control parameter and determining whether the control parameter is less than a switching parameter:
when the control parameter is less than the switching parameter, generating pulse modulation signals according to the control parameter and the switching parameter and using the pulse modulation signals to control the resonant converter to operate for a fixed period within each cycle of the pulse modulation signal, thereby regulating the output voltage; and
when the control parameter is not less than the switching parameter, generating pulse frequency modulation signals according to the control parameter and the switching parameter and using the pulse frequency modulation signals to drive the resonant converter to regulate the output voltage;
wherein each of the pulse modulation signal and the pulse frequency modulation signal has a maximum frequency and a minimum frequency, and the maximum frequency corresponds to the switching parameter;
wherein the output voltage is applied to the load to generate an output current, the output voltage and the output current form an output power, and a frequency of the pulse modulation signal is directly linearly proportional to the output power when the control parameter is less than the switching parameter.

11. The resonant control method according to claim 10, wherein a duty cycle of the pulse frequency modulation signal is 0.5.

12. The resonant control method according to claim 10, wherein a frequency of the pulse frequency modulation signal is linearly inversely proportional to the output power.

13. The resonant control method according to claim 10, wherein a duty cycle of the pulse modulation signal is directly linearly proportional to the output power when the control parameter is less than the switching parameter, a maximum value of the duty cycle is 0.5, a minimum value of the duty cycle equals the fixed period multiplied by the minimum frequency, and the minimum value is less than 0.5.

14. The resonant control method according to claim 10, wherein the switching parameter is equal to the maximum frequency and the step of receiving the reference voltage and the output voltage and using the reference voltage to perform voltage compensation on the output voltage to generate the control parameter comprises:

receiving the reference voltage and the output voltage and subtracting the output voltage from the reference voltage to obtain the difference voltage;

receiving the difference voltage and performing voltage compensation on the difference voltage to generate a voltage parameter; and receiving the voltage parameter and generating a control frequency as the control parameter based on the voltage parameter, the maximum frequency, and the minimum frequency.

15. The resonant control method according to claim 14, wherein the control frequency is represented by Fc, Fc=$(F_{min}-F_{max}) \times P + F_{max}$, $F_{min}$ represents the minimum frequency, $F_{max}$ represents the maximum frequency, and P represents the voltage parameter.

16. The resonant control method according to claim 10, wherein the minimum frequency and the maximum frequency are determined by a resonant tank of the resonant converter, the resonant tank comprises a resonating inductor $L_R$, a magnetizing inductor $L_M$, and a resonating capacitor $C_R$ connected in series, the minimum frequency ranges between $$\frac{1}{2\pi\sqrt{(L_R+L_M)C_R}} \text{ and } \frac{1}{2\pi\sqrt{L_R \cdot C_R}},$$

and the maximum frequency is larger than $$\frac{1}{2\pi\sqrt{L_R C_R}}.$$

* * * * *